United States Patent

[11] 3,562,587

| [72] | Inventor | Sven Forst |
| | | Costa Mesa, Calif. |
| [21] | Appl. No. | 760,786 |
| [22] | Filed | Sept. 19, 1968 |
| [45] | Patented | Feb. 9, 1971 |
| [73] | Assignee | Danfoss, A/S |
| | | Nordborg, Denmark |
| | | a company of Denmark |
| [32] | Priority | Oct. 7, 1967 |
| [33] | | Germany |
| [31] | | P 16 13 734.1 |

[54] OVERHEATING CONTROL DEVICE FOR ALTERNATING CURRENT MOTOR
2 Claims, 1 Drawing Fig.

[52] U.S. Cl. .............................................. 317/13,
317/33, 317/41; 318/221, 318/473
[51] Int. Cl. ....................................................... H02h 7/08,
H02h 5/04
[50] Field of Search........................................... 317/13,
13.3, 41, 33; 318/473, 221, 221.1, 221.3, 332,
(Inquired)

[56] References Cited
UNITED STATES PATENTS

| 3,071,718 | 1/1963 | Gordon.......................... | 317/13 |
| 3,324,352 | 6/1967 | Hover............................ | 317/13 |
| 3,443,188 | 5/1969 | Mortimer..................... | 318/332 |

*Primary Examiner*—James D. Trammell
*Attorney*—Wayne B. Easton

ABSTRACT: The invention relates to an overheating control device for an alternating current motor. The device comprises a symmetrical controlled semiconductor valve in the motor lead and PTC resistor means thermally coupled to the motor windings. The PTC resistor means is connected to the control electrode of the semiconductor valve and concomitant with a temperature rise in the motor windings, the current flowing through the PTC resistor means decreases to effect a closing of the semiconductor valve.

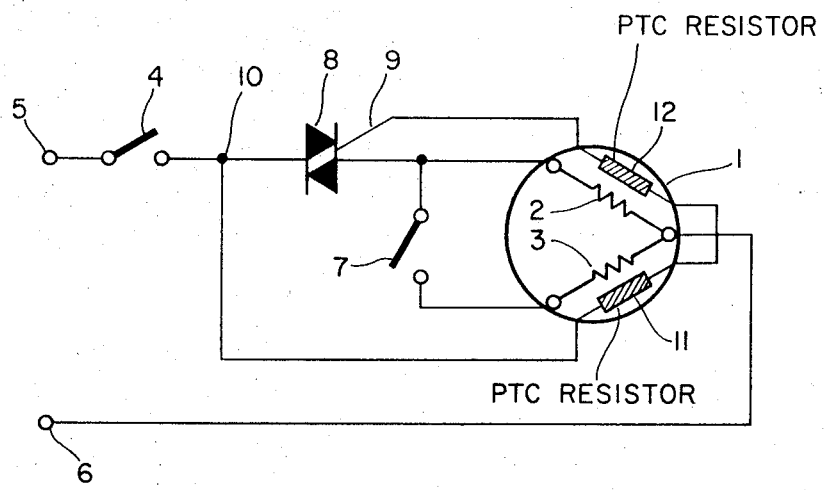

OVERHEATING CONTROL DEVICE FOR ALTERNATING CURRENT MOTOR

This invention relates to a means for preventing overheating in the windings of AC motors, particularly single-phase asynchronous motors.

The safest protection against overheating is provided by thermostatic switches which are contained in the winding and are switched into the motor lead and open with the help of a bimetal system when a prescribed limiting temperature is exceeded. Since, however, it is often necessary to switch off a very heavy current, such thermostatic switches suffer from burning of their contacts, so that in the course of time their switchoff action can become unreliable. Furthermore, for reasons of their design, these switches cannot be made as small as might be required. Thus, they can only be incorporated in the winding with difficulty.

It is further known to incorporate thermoelements in the winding, the voltage provided by these increasing and being used for switching off the motor by way of a relay arrangement when the voltage becomes too great. Such an arrangement is complicated and costly.

It is also known, in the case of a single-phase asynchronous motor, to use a symmetrical controlled semiconductor valve as the starting switch and to couple its control element with the current of the main winding by way of a transformer. Such a transformer is expensive. Furthermore, this switching arrangement does not afford protection against overheating.

The object of the present invention is to provide a means for preventing overheating in the winding of AC motors, which means is of simple construction, operates without sparking and the sensing elements of which can be kept smaller than the known winding thermostats.

According to the invention, this object is achieved by means of a symmetrical controlled semiconductor valve in the motor lead and by means of PTC-resistor, thermally coupled with the winding, through which resistor one pole of the valve is connected to its control electrode. The temperature-dependent change in resistance of PTC-resistors results in the current flowing therethrough decreasing as temperature rises. Consequently, when the winding is relatively cold, the valve opens at the commencement of each half wave. When, however, a certain limiting temperature is exceeded, the control current is so small that the valve remains closed and thus the motor is switched off. Switching in again is not possible as long as the winding temperature is too high. The PTC-resistors can be very small and incorporated directly in the winding.

It is particularly advantageous to fit PTC-resistors at two or more points in the winding or windings and to connect them in series. In this way, it is possible to control a winding at different points at the same time or to control several windings e.g., the starting winding and the normal operating winding of an asynchronous motor.

The invention will now be described in more detail by reference to an embodiment illustrated in the drawing, which shows a connection diagram for the means for preventing overheating with which the invention is concerned.

A single-phase asynchronous motor 1 having a main winding 2 and a starter winding 3 can be connected by way of a main switch 4 to the terminals 5 and 6 of an AC source. A starter switch 7 is provided in known manner for bringing the motor to normal running speed. Contained in the common lead for the normal running winding 2 and the starter winding 3 is a symmetrical, controlled semiconductor valve 8 plus a control electrode 9. From a point 10 in front of the valve 8, a control lead runs through two PTC-resistors 11 and 12 to the control electrode 9. The PTC-resistors 11 and 12 are in thermal contact with the windings 2 and 3; preferably they are incorporated directly in the winding.

The valve 8 can be, for example, a component marketed under the trade name TRIAC. Other elements performing the same function can be used, however.

The valve 8 can be, for example, a component marketed under the trade name TRIAC. Other elements performing the same function can be used, however.

The resistances of the PTC-resistors 11 and 12 are so rated that, when the winding is relatively cold, a sufficiently large current flows through the control electrode 9 to open the valve 8 during each half wave. On the other hand, when the temperature of the winding exceeds a limiting value, the resistance acquires a value such that the control current is no longer sufficient and the valve 8 closes, so that the motor is switched off. Such a switching arrangement is particularly suitable for electric motors that are difficult of access or not accessible at all, for example the motors of encapsulated small refrigerating machines.

I claim:

1. A motor protection circuit for interrupting the supply of power to an alternating current motor upon an abnormal increase in the temperature of the windings of said motor, comprising, a pair of supply lines for connecting said motor to a power source, a symmetrical controlled semiconductor valve in one of said supply lines, said valve having a control electrode, a control line extending between said control electrode and said one of said supply lines at a point between said power source and said valve, a PTC-resistor in said control line and being thermally coupled to said windings.

2. A circuit according to claim 1 including a second PTC-resistor in said control line in series with said first referred to resistor, said second PTC-resistor being thermally coupled to a portion of said windings.